US012556221B2

(12) United States Patent
Wang et al.

(10) Patent No.: US 12,556,221 B2
(45) Date of Patent: Feb. 17, 2026

(54) FILTER SELECTION TECHNIQUE FOR ISOLATING RECEIVER FROM TRANSMIT SIGNAL IN WIRELESS COMMUNICATION DEVICES

(71) Applicant: QUALCOMM Incorporated, San Diego, CA (US)

(72) Inventors: Shaofeng Wang, Shanghai (CN); Rongliang Yang, Shanghai (CN); Devdutt Patnaik, San Jose, CA (US); Rohit Tripathi, San Diego, CA (US); Francis Ming-Meng Ngai, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 17/927,582

(22) PCT Filed: Jul. 14, 2020

(86) PCT No.: PCT/CN2020/101787
§ 371 (c)(1),
(2) Date: Nov. 23, 2022

(87) PCT Pub. No.: WO2022/011529
PCT Pub. Date: Jan. 20, 2022

(65) Prior Publication Data
US 2023/0216535 A1 Jul. 6, 2023

(51) Int. Cl.
*H04B 1/525* (2015.01)
*H04B 1/44* (2006.01)
*H04B 1/50* (2006.01)

(52) U.S. Cl.
CPC .................................... *H04B 1/525* (2013.01)

(58) Field of Classification Search
CPC ...... H04B 1/38; H04B 1/3827; H04B 1/3833; H04B 1/40; H04B 1/44; H04B 1/401;
(Continued)

(56) References Cited

U.S. PATENT DOCUMENTS 7,444,167 B2 * 10/2008 Chang .................. H04B 1/0071 455/84
8,208,867 B2 * 6/2012 Lum .................... H04B 1/0057 455/78
(Continued)

FOREIGN PATENT DOCUMENTS

CN 1934795 A 3/2007
CN 103198950 A 7/2013
(Continued)

OTHER PUBLICATIONS

Supplementary European Search Report—EP20945635—Search Authority—Munich—Mar. 22, 2024.
(Continued)

*Primary Examiner* — Quochien B Vuong
(74) *Attorney, Agent, or Firm* — Loza & Loza LLP

(57) ABSTRACT

In one implementation, a wireless communication device includes a first transceiver configured to generate a transmit signal and a band pass filter (BPF) select circuit configured to filter the transmit signal by a one of a first BPF with a relatively high-frequency passband or a second BPF with a relatively low-frequency passband. The wireless communication device includes a second transceiver configured to receive a received signal filtered by the other one of the first or second BPF. Having the transmit and received signals filtered by two different passband filters improves the isolation between the transmitter and receiver. Another implementation configures the first transceiver to include its own
(Continued)

set of first and second BPFs, and the second transceiver to also include its own first and second BPFs.

30 Claims, 6 Drawing Sheets

(58) Field of Classification Search
CPC . H04B 1/50; H04B 1/525; H04B 1/06; H04B 1/10; H04B 2001/1063
See application file for complete search history.

(56) References Cited

U.S. PATENT DOCUMENTS

| | | | | |
|---|---|---|---|---|
| 9,622,252 | B2 * | 4/2017 | Kadiyala ............ | H04W 72/542 |
| 10,284,244 | B1 | 5/2019 | Kulkarni et al. | |
| 2007/0066245 | A1 | 3/2007 | Snider | |
| 2011/0194546 | A1 | 8/2011 | Sanguinetti | |
| 2015/0036656 | A1 | 2/2015 | Mccarthy et al. | |
| 2015/0200463 | A1 | 7/2015 | Heikura et al. | |
| 2019/0229775 | A1 | 7/2019 | Wloczysiak | |
| 2019/0305831 | A1 | 10/2019 | Freisleben et al. | |
| 2019/0306805 | A1 | 10/2019 | Hasnain et al. | |

FOREIGN PATENT DOCUMENTS

| | | | |
|---|---|---|---|
| CN | 105429649 | A | 3/2016 |
| CN | 105846849 | A | 8/2016 |
| CN | 105933911 | A | 9/2016 |
| CN | 109274378 | A | 1/2019 |
| CN | 110324053 | A | 10/2019 |
| CN | 110581718 | A | 12/2019 |
| CN | 110943757 | A | 3/2020 |
| EP | 1124337 | A2 | 8/2001 |
| WO | 2016164183 | | 10/2016 |

OTHER PUBLICATIONS

3GPP TR 36.816, “3rd Generation Partnership Project; Technical Specification Group Radio Access Networks; Evolved Universal Terrestrial Radio Access (E-UTRA); Study on Signalling and Procedure for Interference Avoidance for in-device Coexistence; (Release 10)”, 3GPP TR 36.816, v0.3.1, Nov. 2010, pp. 1-35.

International Search Report and Written Opinion—PCT/CN2020/101787—ISA/EPO—Apr. 15, 2021.

* cited by examiner

FILTER SELECTION TECHNIQUE FOR ISOLATING RECEIVER FROM TRANSMIT SIGNAL IN WIRELESS COMMUNICATION DEVICES

CROSS-REFERENCE TO RELATED APPLICATION

This application is the U.S. national stage of PCT patent application number PCT/CN2020/101787 filed on Jul. 14, 2020.

FIELD

Aspects of the present disclosure relate generally to transceivers, and in particular, to techniques for selecting transmit and receive filters to substantially isolate a receiver from a transmit signal in wireless communication devices.

DESCRIPTION OF RELATED ART

A wireless transceiver typically includes a power amplifier (PA) on a transmitter-side of the transceiver, and a low noise amplifier (LNA) on the receiver-side of the transceiver. If the isolation between the transmitter and receiver is poor, the signal transmitted by the transmitter will leak into the input of the LNA. To prevent saturation of the LNA due to the leaked transmit signal, the gain of the LNA is lowered. However, lowering the gain of the LNA reduces the sensitivity in detecting the intended received signal. Thus, improving the isolation between a transmitter and a receiver is of interest.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus. The apparatus includes a first wireless transceiver including an output; a second wireless transceiver including an input; a first filter; a second filter; a first antenna; a second antenna; a first set of switching devices configured to selectively couple the output of the first wireless transceiver to the first filter or second filter, and selectively couple the input of the second wireless transceiver to the second filter or the first filter; and a second set of switching devices configured to selectively couple the first filter or second filter to the first antenna, and selectively couple the second filter or first filter to the second antenna.

Another aspect of the disclosure relates to a method. The method includes generating a transmit signal, filtering the transmit signal with one of a first filter response or a second filter response, receiving a received signal, and filtering the received signal with the other one of the first filter response or the second filter response.

Another aspect of the disclosure relates to an apparatus. The apparatus includes means for generating a transmit signal, means for filtering the transmit signal with one of a first filter response or a second filter response, means for receiving a received signal, and means for filtering the received signal with another one of the first filter response or the second filter response.

Another aspect of the disclosure relates to an apparatus. The apparatus includes a first transceiver subsystem including a transmitter front-end, a first filter, a second filter, a first antenna, a first set of one or more switching devices configured to selectively couple the transmitter front-end to the first filter or second filter, and a second set of one or more switching devices configured to selectively couple the first filter or second filter to the first antenna. The apparatus further includes a second transceiver subsystem including a receiver front-end, a third filter, a fourth filter, a second antenna, a third set of one or more switching devices configured to selectively couple the receiver front-end to the third filter or fourth filter, and a fourth set of one or more switching devices configured to selectively couple the third filter or the fourth filter to the second antenna.

Another aspect of the disclosure relates to a method. The method includes generating a transmit signal, filtering the transmit signal with a selected one of a first filter response or a second filter response, receiving a received signal, and filtering the received signal with a selected one of a third filter response or a fourth second filter response.

Another aspect of the disclosure relates to an apparatus. The apparatus includes means for generating a transmit signal, means for filtering the transmit signal with a selected one of a first filter response or a second filter response, means for receiving a received signal, and means for filtering the received signal with a selected one of a third filter response or a fourth second filter response.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
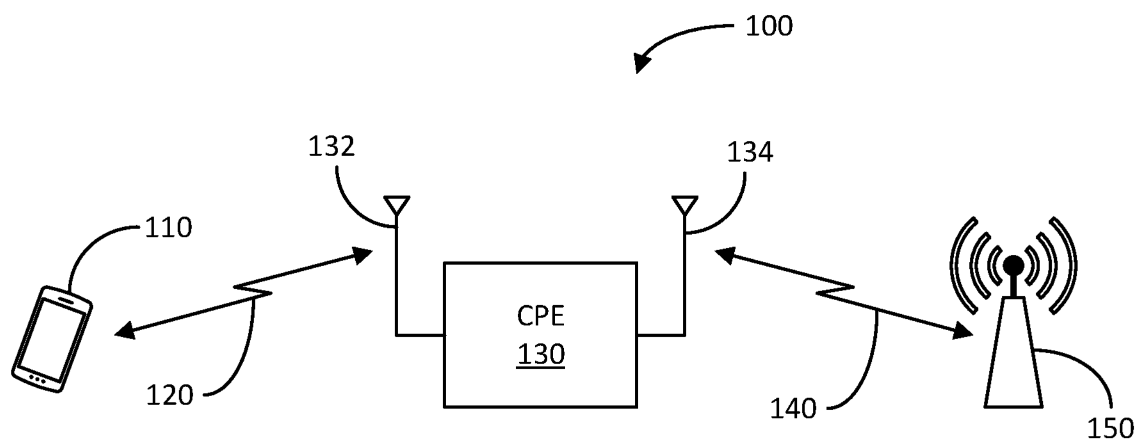
FIG. 1 illustrates a block diagram of an example wireless communication system in accordance with an aspect of the disclosure.

FIG. 1 illustrates a block diagram of an example wireless communication system 100 in accordance with an aspect of the disclosure. The wireless communication system 100 includes a customer premise equipment (CPE) 130, which is a wireless communication device configured to communicate wirelessly with different devices in accordance with different protocols, respectively.

For example, the CPE 130 is configured to wirelessly communicate wireless local area network (WLAN) signals 120 to one or more other wireless communication devices, such as device 110 (e.g., smart phone, computer, laptop, tablet device, Internet-of-Things (IoT) equipment, etc.) via an antenna 132. The WLAN signals 120 may be compliant with any of the 802.11 protocols, such as 802.11ax specified by the Institute of Electrical and Electronics (IEEE), which is often referred to as WiFi.

Similarly, the CPE 130 is configured to wirelessly communicate cellular (wireless wide area network (WWAN)) network signals 140 to one or more other wireless communication devices, such as cellular base station 150, via another antenna 134. The cellular network signals 140 may be compliant with any cellular protocol, such as 4$^{th}$ Generation (4G) specified by 3$^{rd}$ Generation Partnership Project (3GPP), often referred to as Long-Term Evolution (LTE), or 5$^{th}$ Generation (5G) specified by 3GPP, often referred to as New Radio (NR) 5G.

Often, as its name implies, the CPE 130 be located in a house or a commercial building, and the wireless communication device 110 in the vicinity of the CPE 130, such that both devices 110 and 130 are able to communicate with each other via WLAN signals 120. On the other hand, the base station 150 may be situated a remote distance away from the house or commercial building in which the CPE 130 is located, such that the base station 150 and the CPE 130 are able to communicate with each other via cellular signals 140.

In some cases, the base station 150 may send data intended for the wireless communication device 110 to the CPE 130 with the cellular signals 140 being in an unlicensed frequency spectrum. This is often referred to as an "offload" solution, as the cellular network offloads the licensed frequency spectrum for data transmission to the wireless communication device 110, and uses instead the unlicensed frequency spectrum. However, the "offload" unlicensed frequency spectrum coincides with the frequency spectrum used by the CPE 130 to communicate with the wireless communication device 110.

Figure 2:
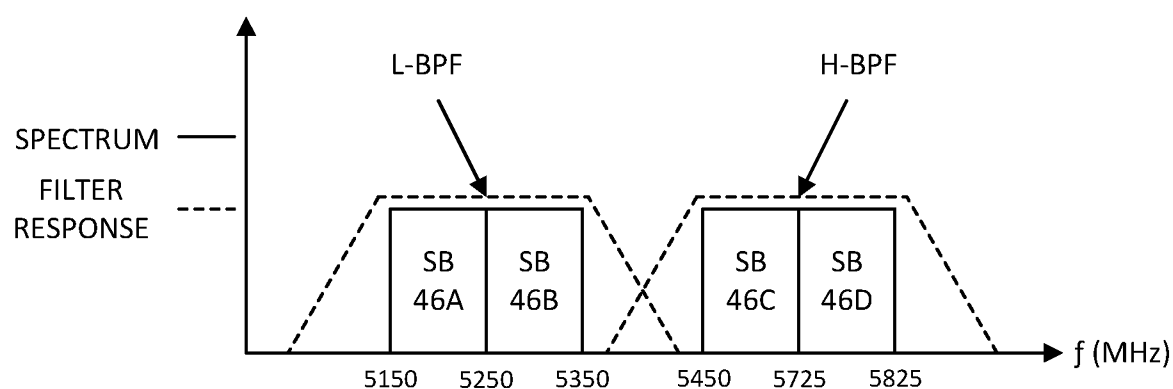
FIG. 2 illustrates a graph of a spectrum and frequency response of an example channel and filters in accordance with another aspect of the disclosure.

FIG. 2 illustrates a graph of a spectrum and frequency response of an example channel and filters in accordance with another aspect of the disclosure. The x- or horizontal-axis of the graph represents frequency (f), and the y- or vertical-axis represents power (e.g., in decibel-milliwatts (dBm)), and filter response in decibels (dB). The unlicensed spectrum discussed above may have four (4) sub-bands (SBs), such as SB 46A, SB46B, SB46C, and SB46D.

In terms of frequency ranges, the sub-band SB46A, which is often referred to as Unlicensed National Information Infrastructure (U-NII)-1 extends from 5150 mega Hertz (MHz) to 5250 MHz; the sub-band SB 46B, which is the lower sub-band of U-NII-2, extends from 5250 MHz to 5350 MHz; the sub-band SB 46C, which is the upper sub-band of U-NII-2, extends from 5450 MHz to 5725 MHz; and the sub-band 46D, which is often referred to as U-NII-3, extends from 5725 MHz to 5825 MHz. The sub-band 46A or U-NII-1 has five (5) channels for transmission of data, the sub-bands 46B and 46C or U-NII-2 has 18 channels for transmission of data, and the sub-band 46D or U-NII-3 has five (5) channels for transmission of data.

As the unlicensed sub-bands are used by the CPE 130 for reception of the cellular signals 140 from the base station 150, and the transmission of the WLAN signals 120 to the wireless communication device 110, there is a potential of interference with the reception of the cellular signals 140 by the CPE 130 by the WLAN signals 120 transmitted by the CPE 130. This is explained further herein with reference to several examples.

Figure 3:
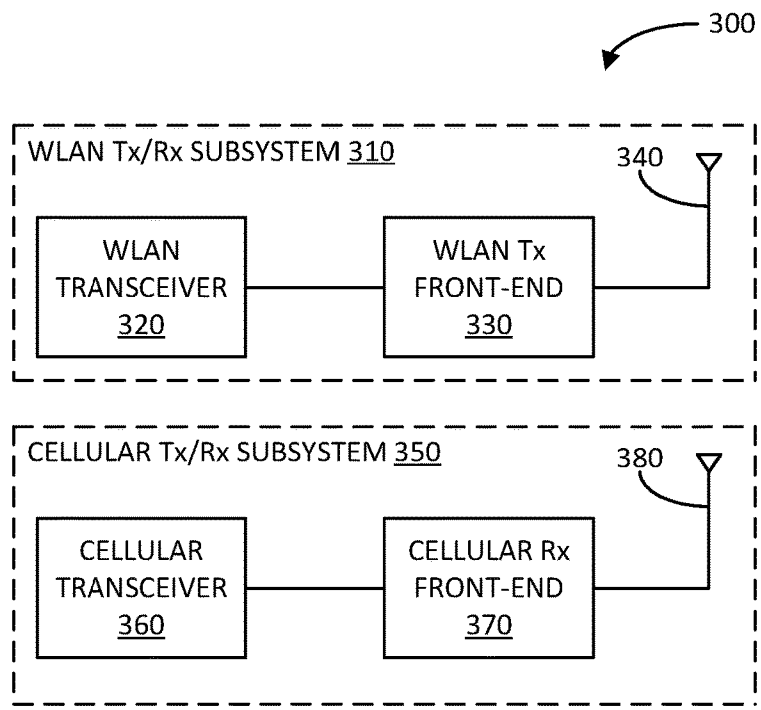
FIG. 3 illustrates a block diagram of an example wireless communication device in accordance with another aspect of the disclosure.

FIG. 3 illustrates a block diagram of an example wireless communication device 300 in accordance with another aspect of the disclosure. The wireless communication device 300 may be an example implementation of the CPE 130. The wireless communication device 300 includes a WLAN transceiver (Tx/Rx) subsystem 310, and a cellular transceiver (Tx/Rx) subsystem 350.

More specifically, the WLAN Tx/Rx subsystem 310 includes a WLAN transceiver 320, a WLAN transmitter front-end 330, and an antenna 340. The WLAN transceiver 320 is configured to generate a radio frequency (RF) signal via one or more channels in a selected one of the sub-bands 46A-46D for transmission of data to, for example, the wireless communication device 110. The WLAN transmitter front-end 330 includes a power amplifier (PA) configured to power amplify the RF signal, and provide the amplified RF signal to the antenna 340 for transmission to one or more wireless communication devices, such as device 110. Although not shown, the WLAN Tx/Rx subsystem 310 includes a WLAN receiver (Rx) front-end coupled to the WLAN transceiver 320 for receiving signals from one or more wireless communication devices, such as device 110.

Similarly, the cellular Tx/Rx subsystem 350 includes a cellular transceiver 360, a cellular receiver (Rx) front-end 370, and an antenna 380. The antenna 380 is configured to receive an RF signal via one or more channels in a selected one of the sub-bands 46A-46D for reception of data from, for example, the base station 150. The WLAN receiver front-end 370 includes a low noise amplifier (LNA) configured to low noise amplify the RF signal, and provide the amplified RF signal to the cellular transceiver 360 for further processing to acquire the data sent by the base station 150. Although not shown, the cellular Tx/Rx subsystem 350 includes a cellular transmitter (Tx) front-end coupled to the cellular transceiver 360 for transmitting signals to the base station 150.

As the WLAN transmission and the cellular reception use the same sub-bands, there should be significant isolation between the antennas 340 and 380 to prevent the signal transmitted by the WLAN Tx/Rx subsystem 310 to adversely affect the reception of the signal by the LNA of the cellular receiver front-end 370 (e.g., by reducing the sensitivity of the LNA due to lower gain so as not to saturate the LNA by the transmit signal) or prevent damage to the LNA itself. As an example, if the output power of the signal transmitted by the WLAN Tx/Rx subsystem 310 is 30 dBm, and the maximum tolerable signal level at the LNA input is 15 dBm, the isolation between antenna 340 and antenna 380 should be more than 15 dB (with zero margin), such as 20 dB (with 5 dB margin), or 25 dB (with 10 dB margin). The higher margin ensures less adverse impact on the intended signal received by the cellular receiver front-end 370, as well as less risk to damage of the LNA due to the transmit signal. However, due to wireless communication devices being continuously redesigned with smaller form factor, achieving the desired antenna-to-antenna isolation becomes more difficult.

Figure 4A:
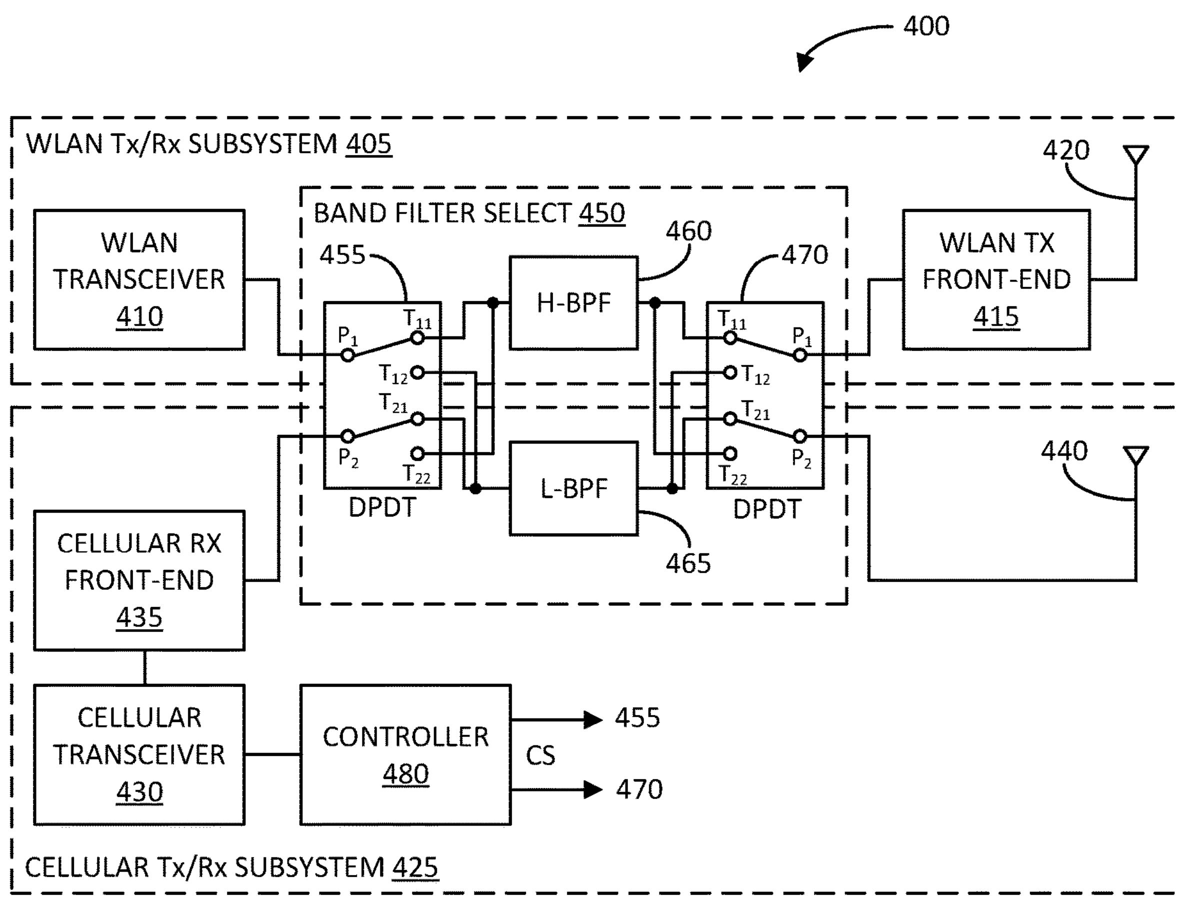
FIG. 4A illustrates a block diagram of an example wireless communication device in a first configuration in accordance with another aspect of the disclosure.

FIG. 4A illustrates a block diagram of an example wireless communication device 400 in a first configuration in accordance with another aspect of the disclosure. Similarly, the wireless communication device 400 may be an example implementation of the CPE 130 previously discussed. In summary, the wireless communication device 400 communicates with the base station 150 and the wireless communication device 110 to communicate over respective channels that are significantly apart in frequency to reduce interference with the reception of the cellular received signal by the WLAN transmit signal.

For example, the wireless communication device 400 may establish the one or more channels for receiving data signals from the base station 150 to be within the lower sub-bands of the unlicensed spectrum, such as sub-bands 46A and/or 46B, and establish one or more channels for transmitting data signals to the wireless communication device 110 to be within the upper sub-bands of the unlicensed spectrum, such as sub-bands 46C and/or 4D. Or, the wireless communication device 400 may establish the one or more channels for receiving data signals from the base station 150 to be within the higher sub-bands of the unlicensed spectrum, such as sub-bands 46C and/or 46D, and establish one or more channels for transmitting data signals to the wireless communication device 110 to be within the lower sub-bands of the unlicensed spectrum, such as sub-bands 46A and/or 4B.

In conjunction with the channel assignments, the wireless communication device 400 includes a high-frequency band pass filter (H-BPF) and a low-frequency BPF (L-BPF). As depicted in FIG. 2, the H-BPF may be configured to have a filter response with a passband (e.g., 3 dB passband) substantially coinciding with the combined frequency range of sub-bands 46C and 46D (e.g., from 5450 MHz to 5825 MHz). The L-BPF may be configured to have a filter response with a passband (e.g., 3 dB passband) substantially coinciding with the combined frequency range of sub-bands 46A and 46B (e.g., from 5150 MHz to 5350 MHz). Further, the filter responses of the H-BPF and L-BPF should provide a minimum signal rejection at the others' passband, such as, for example, −50 dB rejection. Each of the H-BPFs and L-BPFs described herein may be configured as a bulk acoustic filter (BAW), surface acoustic filter (SAW), an LC filter, a ceramic filter, passive on glass (POG) filter.

As an example, if the wireless communication device 400 has established one or more channels for transmitting the WLAN signals within sub-bands 46A and/or 46B, and one or more channels for receiving the cellular signals with sub-bands 46C and/or 46D, the wireless communication device 400 filters the WLAN transmit signals using the L-BPF, and filters the received cellular signals using the H-BPF. Similarly, if the wireless communication device 400 has established one or more channels for transmitting the WLAN signals within sub-bands 46C and/or 46D, and one or more channels for receiving the cellular signals with sub-bands 46A and/or 46B, the wireless communication device 400 filters the WLAN transmit signals using the H-BPF, and filters the received cellular signals using the L-BPF. The channel selection combined with the filter selection improves the isolation between the transmit signal and the input of the LNA so as to reduce interference and potential damage.

More specifically, the wireless communication device 400 includes a WLAN transceiver (Tx/Rx) subsystem 405 and a cellular transceiver (Tx/Rx) subsystem 425. The WLAN Tx/Rx subsystem 405 includes a WLAN transceiver 410, a WLAN transmitter front-end 415, and an antenna 420. Although not shown, the WLAN Tx/Rx subsystem 405 may also include a WLAN receiver front-end coupled to the WLAN transceiver 410. The cellular Tx/Rx subsystem 425 includes an antenna 440, a cellular receiver front-end 435, and a cellular transceiver 430. Although not shown, the cellular Tx/Rx subsystem 425 may also include a cellular transmitter front-end coupled to the cellular transceiver 430.

The wireless communication device 400 further includes a bandpass filter (BPF) select circuit 450 including a first set of switching devices 455 (e.g., configured as a dual pole dual throw (DPDT) switch), a high-frequency BPF (H-BPF) 460, a low-frequency BPF (L-BPF) 465, and a second set of switching devices 470 (e.g., also configured as a DPDT switch).

The DPDT switch 455 includes a first pole $P_1$ coupled to an output of the WLAN transceiver 410 and a second pole $P_2$ coupled to an input of the cellular receiver front-end 435 (e.g., the LNA). The DPDT switch 455 further includes a first set of throws $T_{11}$ and $T_{12}$, associated with the first pole $P_1$, coupled to the H-BPF 460 and L-BPF 465, respectively. Additionally, the DPDT switch 455 further includes a second set of throws $T_{21}$ and $T_{22}$, associated with the second pole $P_2$, coupled to the L-BPF 465 and H-BPF 460, respectively.

The DPDT switch 470 includes a first pole $P_1$ coupled to an input of the WLAN transmitter front-end 415 and a second pole $P_2$ coupled to the antenna 440. The DPDT switch 470 further includes a first set of throws $T_{11}$ and $T_{12}$, associated with the first pole $P_1$, coupled to the H-BPF 460 and L-BPF 465, respectively. Additionally, the DPDT switch 470 further includes a second set of throws $T_{21}$ and $T_{22}$, associated with the second pole $P_2$, coupled to the L-BPF 465 and H-BPF 460, respectively. The WLAN Tx front-end includes an output coupled to the antenna 420.

As discussed, the H-BPF 460 may have a filter frequency response with a passband substantially coinciding with the combined frequency range of sub-bands 46C and 46D, and a specified minimum rejection in the frequency range of sub-bands 46A and 46B, as previously discussed with reference to FIG. 2. Similarly, the L-BPF 465 may have a filter frequency response with a passband substantially coinciding with the combined frequency range of sub-bands 46A and 46B, and a specified minimum rejection in the frequency range of sub-bands 46C and 46D, as previously discussed with reference to FIG. 2.

The wireless communication device 400 includes a controller 480 for channel selection and control of the BPF select circuit 450. The controller 480 is shown coupled to the cellular transceiver 430 for communicating with the base station 150 for selecting the one or more channels in which the cellular signals are to be received. Although not shown, the controller 480 may be coupled to the WLAN transceiver 410 for communicating with the wireless communication device 110 for selecting the one or more channels in which the WLAN signals are to be transmitted. There may be many different manners in which these channels may be selected, but the controller will select the one or more cellular channels to be in one of the sub-bands 46A/46B or sub-bands 46C/46C, and select the one or more WLAN channels to be in the other one of the sub-bands 46A/46B or sub-bands 46C/46C.

For example, if the controller 480 selects one or more channels for transmitting the WLAN signals within sub-bands 46C and/or 46D, and selects one or more channels for receiving the cellular signals with sub-bands 46A and/or 46B, the controller 480 sends control signals (CS) to DPDT switches 455 and 470 to couple the first pole $P_1$ to throw $T_{11}$, and couple the second pole $P_2$ to throw $T_{21}$ in both DPDT switches. In this first configuration, the WLAN transceiver 410, H-BPF 460, WLAN Tx front-end 415, and antenna 420 are coupled in series; and the antenna 440, L-BPF 465, cellular Rx front-end (LNA) 435, and cellular transceiver 430 are coupled in series. Thus, wireless communication device 400 filters the WLAN transmit signals using the H-BPF 460, and filters the received cellular signals using the L-BPF 465. As discussed, the filtering of the transmit signal with the filter response of the H-BPF 460, and the received signal with the filter response of the L-BPF 465 results in sufficient rejection of the transmit signal at the input of the cellular receiver front-end (LNA) 435 to significantly reduce interference and potential damage to the LNA.

Figure 4B:
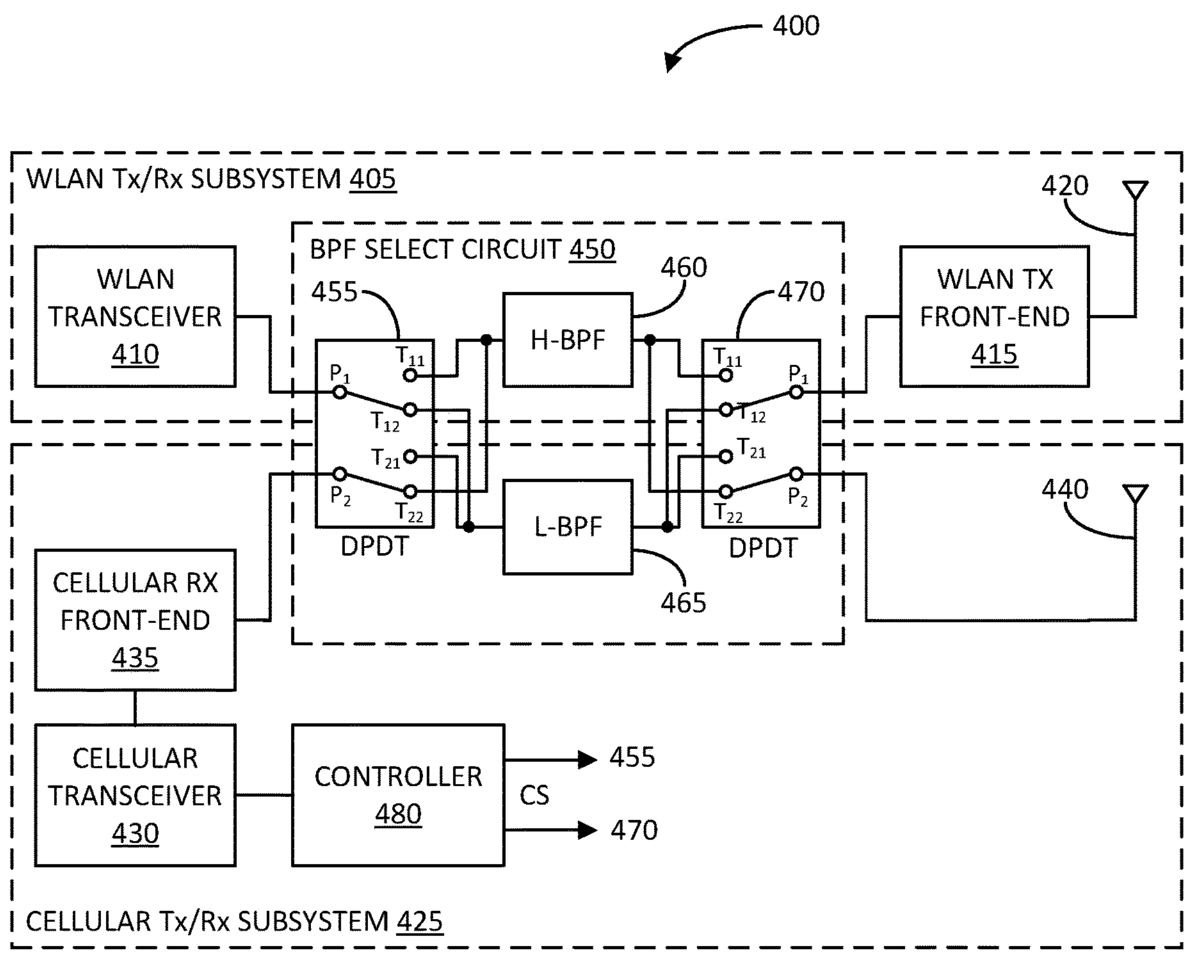
FIG. 4B illustrates a block diagram of the example wireless communication device of FIG. 4A in a second configuration in accordance with another aspect of the disclosure.

FIG. 4B illustrates a block diagram of the example wireless communication device 400 in a second configuration in accordance with another aspect of the disclosure. In the second configuration, the controller 480 selects one or more channels for transmitting the WLAN signals within sub-bands 46A and/or 46B, and selects one or more channels for receiving the cellular signals with sub-bands 46C and/or 46C. Accordingly, the controller 480 sends control signals (CS) to DPDT switches 455 and 470 to couple the first pole $P_1$ to throw $T_{12}$, and couple the second pole $P_2$ to throw $T_{22}$ in both DPDT switches. In the second configuration, the WLAN transceiver 410, L-BPF 465, WLAN Tx front-end 415, and antenna 420 are coupled in series; and the antenna 440, H-BPF 460, cellular Rx front-end (LNA) 435, and cellular transceiver 430 are coupled in series. Thus, wireless communication device 400 filters the WLAN transmit signals using the L-BPF 465, and filters the received cellular signals using the H-BPF 460. As discussed, the filtering of the transmit signal with the filter response of the L-BPF 465, and the received signal with the filter response of the H-BPF 460 results in sufficient rejection of the transmit signal at the input of the cellular receiver front-end (LNA) 435 to significantly reduce interference and potential damage to the LNA.

Figure 5A:
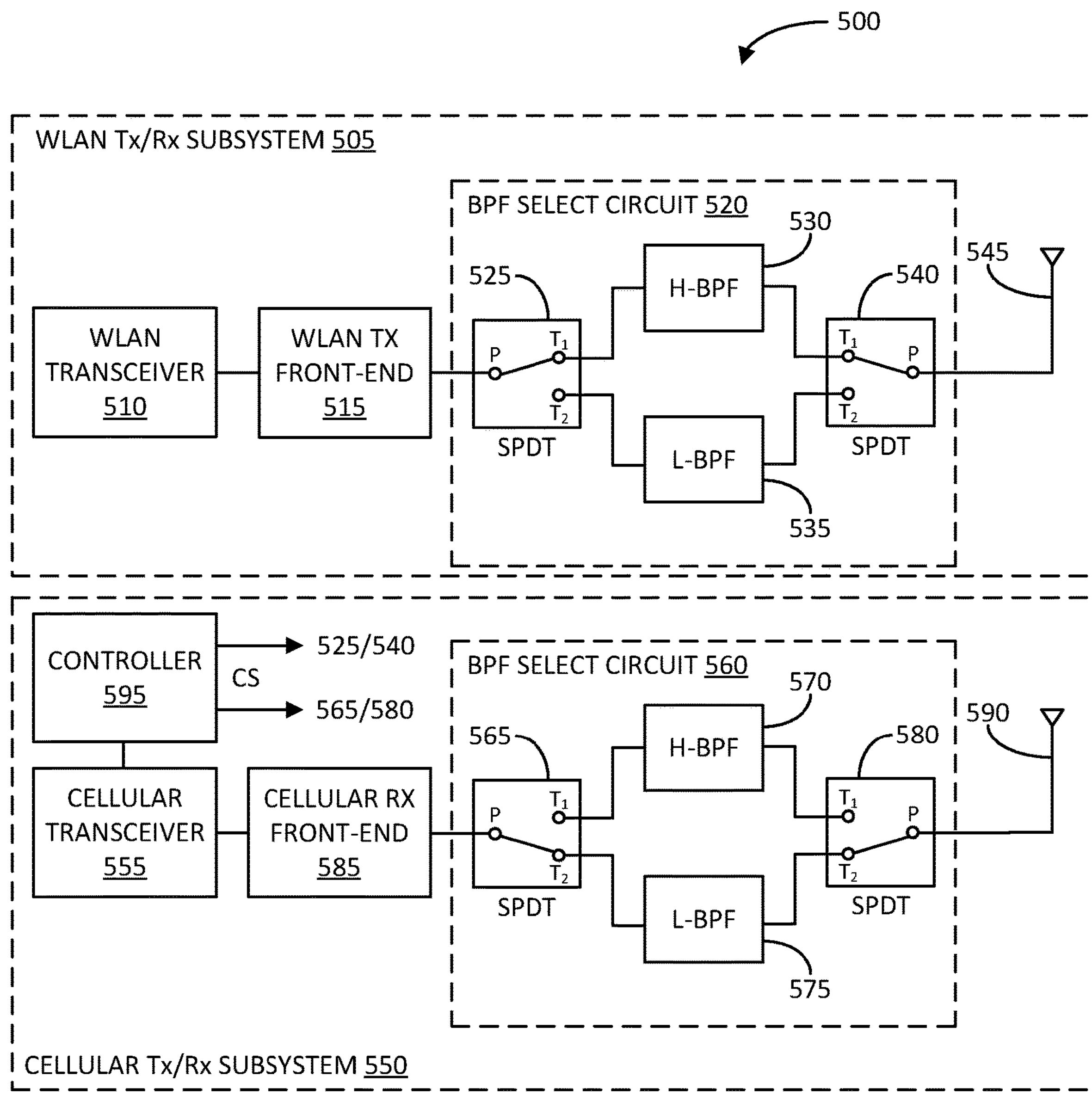
FIG. 5A illustrates a block diagram of an example wireless communication device in a first configuration in accordance with another aspect of the disclosure.

FIG. 5A illustrates a block diagram of an example wireless communication device 500 in a first configuration in accordance with another aspect of the disclosure. The wireless communication device 500 may be an example implementation of CPE 130 previously discussed. The wireless communication device 500 is a variation of wireless communication device 400, with the main difference being that the WLAN Tx/Rx subsystem has its own set of H-BPF and L-BPF, and the cellular Tx/Rx subsystem has its own set of H-BPF and L-BPF.

More specifically, the wireless communication device 500 includes a WLAN transceiver (Tx/Rx) subsystem 505 and a cellular transceiver (Tx/Rx) subsystem 550. The WLAN Tx/Rx subsystem 505 includes a WLAN transceiver 510, a WLAN transmitter front-end 515, a band pass filter (BPF) select circuit 520, and an antenna 545. Although not shown, the WLAN Tx/Rx subsystem 505 may also include a WLAN receiver front-end coupled to the WLAN transceiver 510. The BPF select circuit 520 includes a first set of one or more switching device 525 (e.g., configured as a single pole dual throw (SPDT) switch), a high-frequency BPF (H-BPF) 530, a low-frequency BPF (L-BPF) 535, and a second set of one or more switching device 540 (e.g., also configured as a SPDT switch).

The WLAN transceiver 510 is configured to generate a WLAN transmit signal. The WLAN transmitter front-end 515 includes a power amplifier (PA) configured to amplify the WLAN transmit signal. The SPDT switch 525 includes a pole P coupled to an output of the WLAN front-end 515, a first throw $T_1$ coupled to the H-BPF 530, and a second throw $T_2$ coupled to the L-BPF 535. The SPDT switch 540 includes a first throw $T_1$ coupled to the H-BPF 530, a second throw $T_2$ coupled to the L-BPF, and a pole P coupled to the antenna 545. In the first configuration, the BPF select circuit 520 has the poles P coupled to the first throws $T_1$ of both SPDT switches 525 and 540. Thus, the WLAN transceiver 510, WLAN transmitter front-end 515, H-BPF 530, and antenna 545 are coupled in series.

The cellular Tx/Rx subsystem 550 includes a cellular transceiver 555, a cellular receiver front-end 585, a band pass filter (BPF) select circuit 560, and an antenna 590. Although not shown, the cellular Tx/Rx subsystem 550 may also include a cellular transmitter front-end coupled to the cellular transceiver 555. The BPF select circuit 560 includes a first set of one or more switching device 565 (e.g., configured as a single pole dual throw (SPDT) switch), a high-frequency BPF (H-BPF) 570, a low-frequency BPF (L-BPF) 575, and a second set of one or more switching device 580 (e.g., also configured as a SPDT switch).

The antenna 590 is configured to wirelessly receive a cellular received signal. The SPDT switch 580 includes a pole P coupled to the antenna 590, a first throw $T_1$ coupled to the H-BPF 570, and a second throw $T_2$ coupled to the L-BPF 575. The SPDT switch 565 includes a first throw $T_1$ coupled to the H-BPF 570, a second throw $T_2$ coupled to the L-BPF 575, and a pole P coupled to an input of the cellular Rx front-end (LNA) 585. The cellular Rx front-end 585 is configured to low noise amplify the filtered cellular received signal. The cellular transceiver 555 is configured to process the amplified and filtered cellular received signal to recover the data form the signal. In the first configuration, the BPF select circuit 560 has the poles P coupled to the second throws $T_2$ of both SPDT switches 580 and 565. Thus, the antenna 590, L-BPF 575, cellular Rx front-end 585, and cellular transceiver 555 are coupled in series.

As discussed, the H-BPFs 530 and 570 may each have a filter frequency response with a passband substantially coinciding with the combined frequency range of sub-bands 46C and 46D, and a specified minimum rejection in the frequency range of sub-bands 46A and 46B, as previously discussed with reference to FIG. 2. Similarly, the L-BPFs 535 and 575 may each have a filter frequency response with a passband substantially coinciding with the combined frequency range of sub-bands 46A and 46B, and a specified minimum rejection in the frequency range of sub-bands 46C and 46D, as previously discussed with reference to FIG. 2.

The wireless communication device 500 includes a controller 595 for channel selection and control of the BPF select circuits 520 and 560. The controller 595 is shown coupled to the cellular transceiver 555 for communicating with the base station 150 for selecting the one or more channels in which the cellular signals are to be received. Although not shown, the controller 595 may be coupled to the WLAN transceiver 510 for communicating with the wireless communication device 110 for selecting the one or more channels in which the WLAN signals are to be transmitted. There may be many different manners in which these channels may be selected, but the controller 595 selects the one or more cellular channels to be in one of the sub-bands 46A/46B or sub-bands 46C/46C, and selects the one or more WLAN channels to be in the other one of the sub-bands 46A/46B or sub-bands 46C/46C.

In the first configuration, the controller 595 selects one or more channels for transmitting the WLAN signals within sub-bands 46C and/or 46D, and selects one or more channels for receiving the cellular signals with sub-bands 46A and/or 46B. Accordingly, the controller 595 sends control signals (CS) to SPDT switches 525 and 540 to couple the pole P to the first throw $T_1$ in both SPDT switches. The controller 595 also sends control signals (CS) to SPDT switches 565 and 580 to couple the pole P to the second throw $T_2$ in both SPDT switches.

Accordingly, in this first configuration, the WLAN transceiver 510, WLAN Tx front-end 515, H-BPF 530, and antenna 545 are coupled in series; and the antenna 590, L-BPF 575, cellular Rx front-end (LNA) 585, and cellular transceiver 555 are coupled in series. Thus, wireless communication device 500 filters the WLAN transmit signals using the H-BPF 530, and filters the received cellular signals using the L-BPF 575. As discussed, the filtering of the transmit signal with the filter response of the H-BPF 530, and the received signal with the filter response of the L-BPF 575 results in sufficient rejection of the transmit signal at the input of the cellular receiver front-end (LNA) 585 to significantly reduce interference and potential damage to the LNA.

Figure 5B:
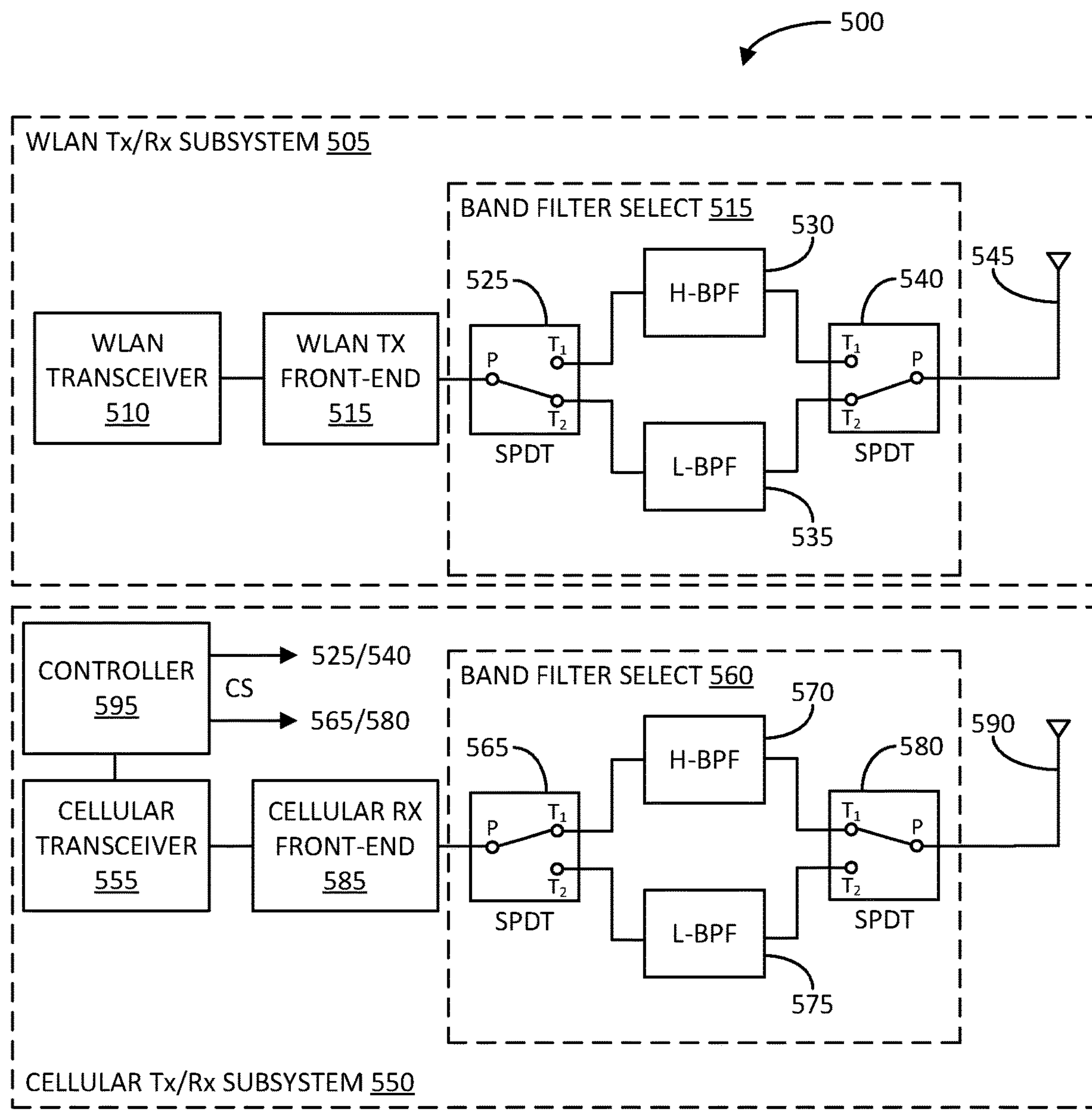
FIG. 5B illustrates a block diagram of the example wireless communication device of FIG. 5A in a second configuration in accordance with another aspect of the disclosure.

FIG. 5B illustrates a block diagram of the example wireless communication device 500 in a second configuration in accordance with another aspect of the disclosure. In the second configuration, the controller 595 selects one or more channels for transmitting the WLAN signals within sub-bands 46A and/or 46B, and selects one or more channels for receiving the cellular signals with sub-bands 46C and/or 46D. Accordingly, the controller 595 sends control signals (CS) to SPDTs 525 and 540 to couple the pole P to the second throw $T_2$ in both SPDTs. The controller 595 also sends control signals (CS) to SPDTs 565 and 580 to couple the pole P to the first throw $T_1$ in both SPDTs.

Accordingly, in the second configuration, the WLAN transceiver 510, WLAN Tx front-end 515, L-BPF 553, and antenna 545 are coupled in series; and the antenna 590, H-BPF 570, cellular receiver front-end (LNA) 585, and cellular transceiver 555 are coupled in series. Thus, wireless communication device 500 filters the WLAN transmit signals using the L-BPF 534, and filters the received cellular signals using the H-BPF 570. As discussed, the filtering of the transmit signal with the filter response of the L-BPF 535, and the received signal with the filter response of the H-BPF 570 results in sufficient rejection of the transmit signal at the input of the cellular receiver front-end (LNA) 585 to significantly reduce interference and potential damage to the LNA.

Figure 6:
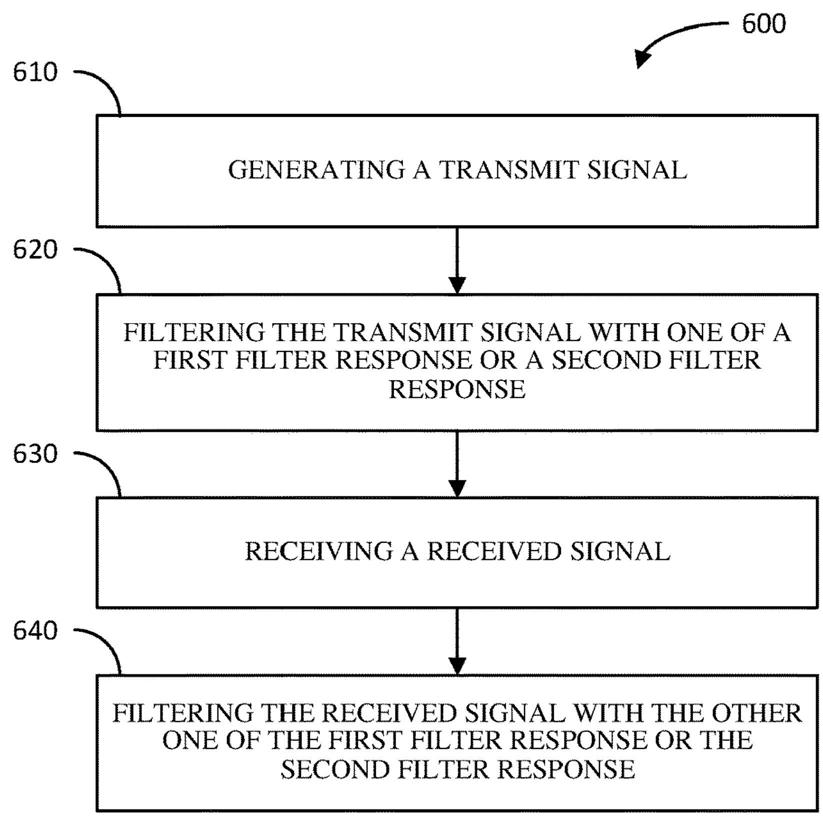
FIG. 6 illustrates a flow diagram of an example method of transmitting and receiving signals in accordance with another aspect of the disclosure.

FIG. 6 illustrates a flow diagram of an example method 600 of transmitting and receiving signals in accordance with another aspect of the disclosure. The method 600 includes generating a transmit signal (block 610). An example of a means for generating a transmit signal includes the WLAN transceiver 410 previously discussed.

The method 600 further includes filtering the transmit signal with one of a first filter response or a second filter response (block 620). An example of a means for filtering the transmit signal with one of a first filter response or a second filter response includes the BPF select circuit 450 in the first configuration shown in FIG. 4A or the second configuration shown in FIG. 4B, as previously discussed.

The method 600 also includes receiving a received signal (block 630). An example of a means for receiving a received signal includes the antenna 440 previously discussed.

Additionally, the method 600 includes filtering the received signal with the other one of the first filter response or the second filter response (block 640). An example of a means for filtering the received signal with the other one of the first filter response or the second filter response includes the BPF select circuit 450 in the second configuration shown in FIG. 4B or the first configuration shown in FIG. 4A, as previously discussed.

Figure 7:
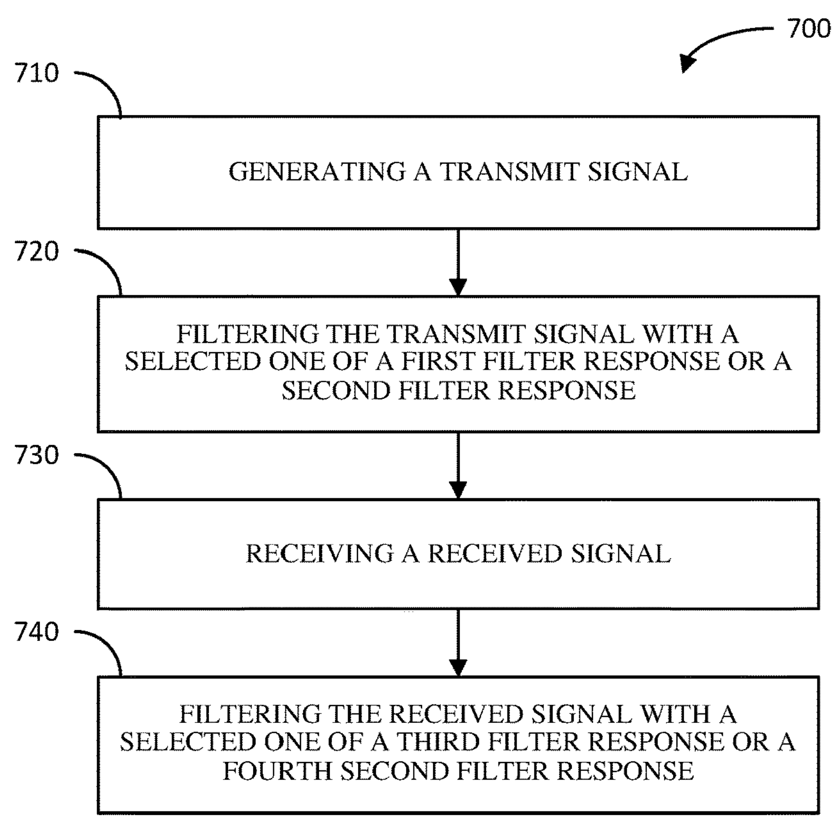
FIG. 7 illustrates a flow diagram of another example method of transmitting and receiving signals in accordance with another aspect of the disclosure.

FIG. 7 illustrates a flow diagram of an example method 700 of transmitting and receiving signals in accordance with another aspect of the disclosure. The method 700 includes generating a transmit signal (block 710). An example of a means for generating a transmit signal includes the WLAN transceiver 510 or WLAN transmitter front-end 515, previously discussed.

The method 700 further includes filtering the transmit signal with a selected one of a first filter response or a second filter response (block 720). An example of a means for filtering the transmit signal with a selected one of a first filter response or a second filter response includes the BPF select circuit 520 in the first configuration shown in FIG. 5A or the second configuration shown in FIG. 5B, as previously discussed.

The method 700 also includes receiving a received signal (block 730). An example of a means for receiving a received signal includes the antenna 590 previously discussed.

Additionally, the method 700 includes filtering the received signal with a selected one of a third filter response or a fourth second filter response (block 740). An example of a means for filtering the received signal with a selected one of a third filter response or a fourth second filter response includes the BPF select circuit 560 in the first configuration shown in FIG. 5A or the second configuration shown in FIG. 5B, as previously discussed.

Although in the examples provided herein, the BPF select circuits have been described with respect to substantially isolating an input of a cellular (WWAN) transceiver (LNA) from the transmit signal of a WLAN transceiver, it shall be understood that the BPF select circuits may also be used for substantially isolating an input of a WLAN transceiver (LNA) from the transmit signal of a cellular or WWAN transceiver; or in other applications where signal isolation is needed between a transmitter and receiver.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
a first transceiver including an output;
a second transceiver including an input;
a first filter;
a second filter;
a first antenna;
a second antenna;
a first set of switching devices configured to:
selectively couple the output of the first transceiver to the first filter or second filter; and
selectively couple the input of the second transceiver to the second filter or the first filter; and
a second set of switching devices configured to:
selectively couple the first filter or second filter to the first antenna; and
selectively couple the second filter or first filter to the second antenna.

2. The apparatus of claim 1, wherein the first filter comprises a first bandpass filter (BPF) and the second filter comprises a second bandpass filter (BPF), wherein a passband of the first BPF is different than a passband of the second BPF.

3. The apparatus of claim 2, wherein the passband of the first BPF extends from substantially 5150 mega Hertz (MHz) to substantially 5350 MHz, and the passband of the second BPF extends from substantially 5450 MHz to 5825 MHz.

4. The apparatus of claim 2, wherein the first BPF is configured to provide a first minimum signal rejection at the passband of the second BPF, and the second BPF is configured to provide a second minimum signal rejection at the passband of the first BPF.

5. The apparatus of claim 4, wherein the first or second minimum rejection includes-50 decibels (DBs).

6. The apparatus of claim 1, wherein the first filter or second filter comprises a bulk acoustic filter (BAW), surface acoustic filter (SAW), an LC filter, a ceramic filter, passive on glass (POG) filter.

7. The apparatus of claim 1, wherein the first set of switching devices comprises a dual pole dual throw (DPDT) switch including a first pole coupled to the output of the first transceiver, a second pole coupled to an input of the second transceiver, first and second throws, associated with the first pole, coupled to the first and second filters, respectively, and third and fourth poles, associated with the second pole, coupled to the second and first filters, respectively.

8. The apparatus of claim 1, wherein the second set of switching devices comprises a dual pole dual throw (DPDT) switch including a first pole coupled to the first antenna, a second pole coupled to the second antenna, first and second throws, associated with the first pole, coupled to the first and second filters, respectively, and third and fourth poles, associated with the second pole, coupled to the second and first filters, respectively.

9. The apparatus of claim 1, further comprising a transmitter front-end coupled between the second set of switching devices and the first antenna.

10. The apparatus of claim 9, wherein the transmitter front-end comprises a power amplifier.

11. The apparatus of claim 1, further comprising a receiver front-end coupled between the first set of switching devices and the second transceiver.

12. The apparatus of claim 11, wherein the receiver front-end comprises a low noise amplifier (LNA).

13. The apparatus of claim 1, wherein the first transceiver is configured to generate a wireless local area network (WLAN) signal, and wherein the second transceiver is configured to receive a cellular network signal.

14. The apparatus of claim 1, further comprising a controller configured to control the first and second sets of switching devices, wherein the controller is configured to control the first and second sets of switching devices such that the first transceiver, the first filter, and the first antenna are coupled in series, and the second transceiver, the second filter, and the second antenna are coupled in series.

15. The apparatus of claim 1, further comprising a controller configured to control the first and second sets of switching devices, wherein the controller is configured to control the first and second sets of switching devices such that the first transceiver, the second filter, and the first antenna are coupled in series, and the second transceiver, the first filter, and the second antenna are coupled in series.

16. The apparatus of claim 1, wherein the first transceiver is configured to transmit a first signal within a frequency range, wherein the second transceiver is configured to receive a second signal within the frequency range, wherein the first filter has a first passband within the frequency range, wherein the second filter has a second passband within the frequency range, the first passband not overlapping with the second passband.

17. A method, comprising:
generating a wireless local area network (WLAN) transmit signal;
filtering the WLAN transmit signal with a selected one of a first filter response or a second filter response, the first filter response and the second filter response having different non-overlapping passbands;
receiving a cellular signal; and
filtering the received cellular signal with the other one of the first filter response or the second filter response, the other one of the first filter response or the second filter response having a passband coinciding with a cellular sub-band having a frequency range different than a channel of the WLAN transmit signal.

18. The method of claim 17, further comprising:
low noise amplifying the filtered received cellular signal; and
power amplifying the filtered WLAN transmit signal.

19. An apparatus, comprising:
a first transceiver subsystem configured for wireless local area network (WLAN) transmission, comprising:
a transmitter front-end;
a first filter;
a second filter;
a first antenna;
a first set of one or more switching devices configured to selectively couple the transmitter front-end to the first filter or the second filter; and
a second set of one or more switching devices configured to selectively couple the first filter or the second filter to the first antenna; and
a second transceiver subsystem configured for cellular network reception, comprising:
a receiver front-end;
a third filter;
a fourth filter;
a second antenna;

a third set of one or more switching devices configured to selectively couple the receiver front-end to the third filter or the fourth filter; and a fourth set of one or more switching devices configured to selectively couple the third filter or the fourth filter to the second antenna, wherein the first filter and the second filter each have different passbands coinciding with respective cellular network reception sub-bands.

20. The apparatus of claim 19, wherein the first filter comprises a first bandpass filter (BPF) and the second filter comprises a second bandpass filter (BPF), wherein a passband of the first BPF is different than a passband of the second BPF.

21. The apparatus of claim 20, wherein the passband of the first BPF extends from substantially 5150 mega Hertz (MHz) to substantially 5350 MHz, and the passband of the second BPF extends from substantially 5450 MHz to 5825 MHz.

22. The apparatus of claim 19, wherein the third filter comprises a first bandpass filter (BPF) and the fourth filter comprises a second bandpass filter (BPF), wherein a passband of the first BPF is different than a passband of the second BPF.

23. The apparatus of claim 22, wherein the passband of the first BPF extends from substantially 5150 mega Hertz (MHz) to substantially 5350 MHz, and the passband of the second BPF extends from substantially 5450 MHz to 5825 MHz.

24. The apparatus of claim 19, wherein the first set of one or more switching devices comprises a single pole dual throw (SPDT) switch including a pole coupled to the transmitter front-end, and first and second throws coupled to the first and second filters, respectively.

25. The apparatus of claim 19, wherein the second set of one or more switching devices comprises a single pole dual throw (SPDT) switch including a pole coupled to the first antenna, and first and second throws coupled to the first and second filters, respectively.

26. The apparatus of claim 19, wherein the third set of one or more switching devices comprises a single pole dual throw (SPDT) switch including a pole coupled to the receiver front-end, and first and second throws coupled to the third and fourth filters, respectively.

27. The apparatus of claim 19, wherein the fourth set of one or more switching devices comprises a single pole dual throw (SPDT) switch including a pole coupled to the second antenna, and first and second throws coupled to the third and fourth filters, respectively.

28. The apparatus of claim 19, further comprising a controller configured to control the first, second, third, and fourth sets of one or more switching devices, wherein the controller is configured to:

control the first and second sets of switching devices such that the transmitter front-end, the first filter, and the first antenna are coupled in series; and control the third and fourth sets of switching devices such that the receiver front-end, the fourth filter, and the second antenna are coupled in series.

29. The apparatus of claim 19, further comprising a controller configured to control the first, second, third, and fourth sets of one or more switching devices, wherein the controller is configured to:

control the first and second sets of switching devices such that the transmitter front-end, the second filter, and the first antenna are coupled in series; and control the third and fourth sets of switching devices such that the receiver front-end, the third filter, and the second antenna are coupled in series.

30. An apparatus for wireless communications, comprising:

a WLAN transceiver circuit including transmit circuitry along a transmit path coupled to a first antenna, the transmit circuitry configured to transmit signals via the first antenna over a frequency range;

a WWAN transceiver circuit including receive circuitry along a receive path coupled to a second antenna, the receive circuitry configured to receive signals via the second antenna over the frequency range;

a first filter having a passband within a first portion of the frequency range;

a second filter having a passband within a second portion of the frequency range different than the first portion, a first set of switching devices configured to:

selectively couple an output of the WLAN transceiver circuit to the first filter or second filter; and selectively couple an input of the WWAN transceiver circuit to the second filter or the first filter; and a second set of switching devices configured to:

selectively couple the first filter or second filter to the first antenna; and selectively couple the second filter or first filter to the second antenna.

* * * * *